(12) United States Patent
Kobayashi et al.

(10) Patent No.: US 8,173,932 B2
(45) Date of Patent: May 8, 2012

(54) PERFORATION METHOD AND PERFORATION APPARATUS

(75) Inventors: Takashi Kobayashi, Tochigi-ken (JP);
Akihiro Nemoto, Tochigi-ken (JP);
Hiroaki Yamagishi, Utsunomiya (JP);
Katsuyuki Nakajima, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 882 days.

(21) Appl. No.: 12/178,263

(22) Filed: Jul. 23, 2008

(65) Prior Publication Data

US 2009/0032508 A1    Feb. 5, 2009

(30) Foreign Application Priority Data

Jul. 30, 2007   (JP) ................................ 2007-197859

(51) Int. Cl.
   *B23K 26/38* (2006.01)
(52) U.S. Cl. ................................ 219/121.7; 219/121.71
(58) Field of Classification Search ............... 219/121.7, 219/121.71, 121.67–121.69, 121.72; 239/589–601
   See application file for complete search history.

(56) References Cited

U.S. PATENT DOCUMENTS

| | | | | |
|---|---|---|---|---|
| 2,809,154 A | * | 10/1957 | Storrs | 201/5 |
| 4,156,571 A | * | 5/1979 | Ljung | 356/445 |
| 4,228,406 A | * | 10/1980 | Lewis et al. | 372/33 |
| 4,239,954 A | | 12/1980 | Howard | |
| 4,857,696 A | * | 8/1989 | Taeusch et al. | 219/121.7 |
| 6,365,871 B1 | * | 4/2002 | Knowles et al. | 219/121.7 |
| 6,407,362 B1 | * | 6/2002 | Schmid et al. | 219/121.71 |
| 2007/0175872 A1 | * | 8/2007 | Rhoades et al. | 219/121.73 |

FOREIGN PATENT DOCUMENTS

| | | | |
|---|---|---|---|
| CN | 1490115 | | 4/2004 |
| DE | 19908630 A1 | * | 8/2000 |
| DE | 103 14 844 | | 10/2004 |
| EP | 1 661 658 | | 5/2006 |
| JP | 01146386 A | * | 6/1989 |
| JP | 09-066381 | | 3/1997 |
| JP | 09066381 A | * | 3/1997 |
| JP | 2001-526961 | | 12/2001 |
| JP | 2006218346 A | * | 8/2006 |
| WO | 2007/089469 | | 8/2007 |

* cited by examiner

*Primary Examiner* — Samuel M Heinrich
(74) *Attorney, Agent, or Firm* — Rankin, Hill & Clark LLP

(57) ABSTRACT

A perforation method and an perforation apparatus in which a hollow member of a fuel injection nozzle is filled with a filler such as a zirconia ball, and a laser light is applied to the hollow member to form an injection hole while vibrating the zirconia ball using an ultrasonic vibrator. After the injection hole is formed, the laser light is introduced through the injection hole to the inside of the fuel injection nozzle, and thereby is applied to the vibrated zirconia ball.

20 Claims, 3 Drawing Sheets

PERFORATION METHOD AND PERFORATION APPARATUS

BACKGROUND OF THE INVENTION

1. Field of the Invention

The present invention relates to a perforation method of forming a through-hole in a wall of a hollow member by laser irradiation, and an apparatus for the perforation.

2. Description of the Related Art

An end portion of a fuel injection nozzle 1 to be installed in automobiles is shown in FIG. 3. The end portion of the fuel injection nozzle 1 has a hollow structure as shown in FIG. 3.

A plurality of injection holes 2 extend though the wall of the end portion of the fuel injection nozzle 1. In recent years, such holes have been formed by using a laser light L.

The end portion is irradiated with the laser light L from the outside. Therefore, the wall of the end portion is melted by the laser light L from the outside to the inside. Finally the inner wall surface is melted to form the injection hole 2.

When the irradiation with the laser light L is continued even for a short time after the inner wall is melted to form the injection hole 2, the laser light L reaches the opposite inner wall at a position on the line extending from the injection hole 2. In this case, the opposite inner wall (opposite wall) is melted at the position as a matter of course. Thus, it is difficult to form a through-hole without damaging the opposite wall in the perforation process using the laser light L.

A method for forming the injection hole in the end portion of the fuel injection nozzle by the laser light by inserting a mirror reflector into the end portion is proposed in Japanese Laid-Open Patent Publication No. 09-066381. In this method, the laser light introduced through the injection hole is reflected by the mirror reflector to a light absorber, whereby the laser light is prevented from reaching the opposite wall.

Further, a method, in which a fluid (particularly a liquid) to the end portion of the fuel injection nozzle is introduced for causing cavitation to scatter the laser light, is proposed in Japanese Laid-Open Patent Publication No. 2001-526961 (PCT).

In the related art described in Japanese Laid-Open Patent Publication No. 09-066381, when the incidence angle of the laser light or the reflection angle of the mirror reflector is not strictly controlled, the laser light is reflected to the inner wall. Thus, in the related art, disadvantageously it is difficult to reliably prevent the reflection of the laser light to the inner wall.

In the related art described in Japanese Laid-Open Patent Publication No. 2001-526961 (PCT), a part of the scattered laser light may reach the inner wall, so that the inner wall may be damaged depending on the output of the laser light.

SUMMARY OF THE INVENTION

A general object of the present invention is to provide a perforation method capable of forming a hole by a laser light while preventing damage on an opposite wall.

A principal object of the present invention is to provide a perforation apparatus capable of forming a hole while preventing damage on an opposite wall.

According to an aspect of the present invention, there is provided a perforation method for forming a through-hole in a wall of a hollow member by irradiating the wall with a laser light from the outside, comprising the steps of inserting a filler that is not melted by the laser light into the hollow member, and irradiating the wall with the laser light while vibrating the filler, wherein when the through-hole is formed, the laser light is applied through the through-hole to the filler.

In this perforation method, the laser light melts the wall, reaches inside the hollow member, and is applied to the filler in the hollow member. Since the filler is not melted, the laser light is blocked by the filler and thereby is prevented from reaching the opposite wall.

A portion of the filler, which is irradiated with the laser light, is often removed (for example collapsed by the irradiation). However, the filler is constantly rotated or vertically moved under the vibration, and the position, to which the laser light is applied, is constantly changed. In other words, the laser light is not applied continuously to the same position of the filler. Thus, the laser light can be prevented from reaching the opposite wall through the filler.

By preventing the laser light from reaching the opposite wall in the above manner, the opposite wall can be prevented from being damaged.

The filler may comprise a powder. In this case, it is preferred that a pressure is applied to the powder during the irradiation with the laser light. When the powder is collapsed, because a fine powder is generated and penetrates between the powder particles, the apparent volume of the powder is reduced, and a pore (i.e. a laser light path) is formed in the filler. However, when the pressure is applied to the powder, the powder is compressed to close the pore (i.e. the laser light path), so that the opposite wall can be effectively prevented from being damaged.

According to another aspect of the present invention, there is provided a perforation apparatus for forming a through-hole in a wall of a hollow member by irradiating the wall with a laser light from the outside, comprising a filler that is inserted into the hollow member and is not melted by the laser light, and a vibration means for vibrating the filler.

The hollow member is irradiated with the laser light while vibrating the filler using the vibration means as described above, so that the opposite wall can be prevented from being damaged.

The filler may comprise a powder. In this case, it is preferred that the perforation apparatus further comprises a pressure application means for applying a pressure to the powder.

As described above, in the present invention, the hollow member is filled with the filler and irradiated with the laser light to form the through-hole therein while vibrating the filler, whereby the laser light that has passed through the hole can be prevented from reaching the opposite wall. Thus, the opposite wall can be prevented from being damaged remarkably easily without a complicated trial and error process of strictly control of the laser light irradiation conditions, etc.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of the perforation method and the apparatus therefor according to the present invention will be described in detail below with reference to accompanying drawings.

Figure 1:
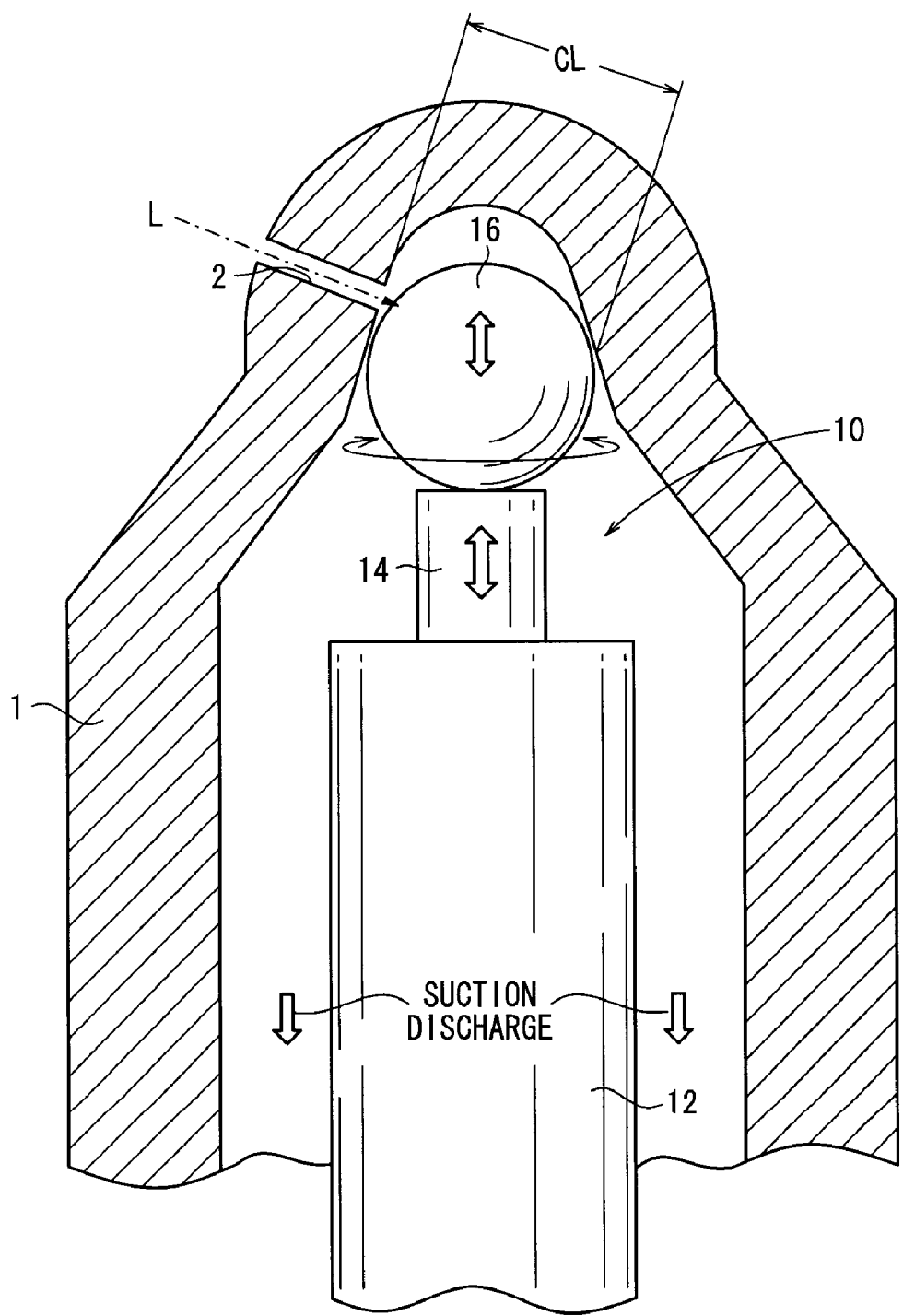
FIG. 1 is an enlarged longitudinal cross-sectional view showing a principal part of an end portion of a fuel injection nozzle, into which a perforation apparatus according to a first embodiment of the present invention is inserted.

FIG. 1 is an enlarged longitudinal cross-sectional view showing a principal part of an end portion of a fuel injection nozzle 1, into which a perforation apparatus 10 according to a first embodiment of the present invention is inserted. The perforation apparatus 10 contains a laser light emission mechanism (not shown), a vibration mechanism having an ultrasonic vibrator 12, and a zirconia ball 16 (a filler) inserted into the end portion with being supported by a probe 14 of the ultrasonic vibrator 12.

As shown in FIG. 1, the end portion of the fuel injection nozzle 1 has a hollow structure. In a fuel injection mechanism, a valve is inserted into the hollow end portion.

The laser light emission mechanism can emit a laser light L at an output sufficient for forming an injection hole 2 through the wall of the fuel injection nozzle 1. For example, the laser light L may be emitted by using a pulse laser device at an oscillation frequency of 1 to 10 kHz and an energy of 1 mJ.

It is preferred that the ultrasonic vibrator 12 can vibrate the filler at a frequency higher than the oscillation frequency of the laser light L. In this case, each pulse of the laser light L is applied to a different position of the zirconia ball 16 as described below. For example, when the laser light L is emitted under the above conditions, the zirconia ball 16 may be vibrated by the ultrasonic vibrator 12 at a vibration frequency of 64 kHz and an amplitude of 14 μm.

The zirconia ball 16 is composed of an oxide ceramic zirconia. As is well known in the art, the zirconia has a remarkably high melting point, and is not melted by the laser light L. When a portion of the zirconia ball 16 is irradiated with the laser light L, the portion is collapsed and generates a fine powder.

The diameter of the zirconia ball 16 is controlled depending on the irradiation time and the oscillation frequency of the laser light L such that the laser light L can be prevented from reaching the opposite wall during laser light irradiation. When $V_0$ is the volume of the zirconia ball 16 before the irradiation with the laser light L, Z is the volume of a collapsed portion in the zirconia ball 16 per one pulse, t is the time of the irradiation with the laser light L, and f is the oscillation frequency of the laser light L, a minimum radius R for the zirconia ball 16 is obtained using the following equation (1):

$$R = \{(3V_0 - tfZ)/4\pi\}^{1/3} \quad (1)$$

Thus, the zirconia ball 16 has a radius larger than the radius R obtained by the equation (1).

In the first embodiment, a clearance CL on a line extending from the injection hole 2 is about 0.8 mm between the inner wall, in which the injection hole 2 is formed, and the opposite wall. Meanwhile, the zirconia ball 16 has a diameter of about 1 mm.

The perforation apparatus 10 according to the first embodiment basically has the above structure. A perforation method using the perforation apparatus 10 will be described below.

In the perforation method, first the zirconia ball 16 and the ultrasonic vibrator 12 are inserted into the end portion of the fuel injection nozzle 1. In this step, the zirconia ball 16 is supported by the probe 14 of the ultrasonic vibrator 12.

Then, the ultrasonic vibrator 12 is oscillated to vibrate the zirconia ball 16. For example, the zirconia ball 16 may be vibrated under conditions of a vibration frequency of 64 kHz and an amplitude of 14 μm as described above. Under the vibration conditions, the zirconia ball 16 having a diameter of about 1 mm rotates while moving upward and downward by about 0.1 mm in the vertical direction of FIG. 1. Thus, the zirconia ball 16 is brought into contact with and separated from the probe 14 repeatedly while rotating.

In this state, the laser light L is emitted from the laser light emission mechanism. The outer wall surface of the fuel injection nozzle 1 is irradiated with the laser light L, and the wall of the fuel injection nozzle 1 is melted by the laser light L from the outside to the inside. The formation of the injection hole 2 proceeds with the melting of the wall.

Finally the inner wall surface of the fuel injection nozzle 1 is melted by the laser light L, and the laser light L is introduced into the hollow space of the fuel injection nozzle 1. In the first embodiment, the zirconia ball 16 is inserted into the hollow structure as described above. Thus, the zirconia ball 16 is irradiated with the laser light L.

The zirconia ball 16 has a remarkably high melting point, and is not melted by the laser light L. However, since the laser light L has a high energy, the physical bonding force is lowered at a portion of the zirconia ball 16, which is irradiated with the laser light L. Thus, the portion is collapsed and removed from the zirconia ball 16. The collapsed portion remains in the fuel injection nozzle 1 in the state of a fine powder.

As described above, the zirconia ball 16 constantly rotates and vertically moves during the irradiation with the laser light L. Therefore, each pulse of the laser light L is applied to a different position of the zirconia ball 16. In other words, the laser light L is not applied continuously to the same position of the zirconia ball 16. Thus, the laser light L can be prevented from reaching the opposite wall through the zirconia ball 16.

In the first embodiment, since the zirconia ball 16 is vibrated, and thereby rotates and vertically moves, the laser light L can be effectively prevented from reaching the opposite wall. Even when, for example, the irradiation with the laser light L (the perforation) is carried out for a relatively long time of 1 minute under the above conditions, the opposite wall still can be prevented from being damaged.

In addition, as compared with the other ceramic balls, the zirconia ball 16 generates a smaller amount of the fine powder. In other words, in the case of using the zirconia ball 16, only a smaller amount of the fine powder remains in the fuel injection nozzle 1. Thus, the zirconia ball 16 is advantageous in that the rotational or vertical motion of the filler is not inhibited by a large amount of the fine powder deposited.

The fine powder may be sucked and discharged from the fuel injection nozzle 1 by a fine powder suction/discharge means (not shown). In this case, the fine powder can be more easily prevented from remaining in the fuel injection nozzle 1.

The zirconia ball 16 can be irradiated with the laser light L until the radius of the zirconia ball 16 becomes the above minimum radius R obtained by the equation (1). In other words, the time until the zirconia ball 16 reaches the durability limit and the laser light L reaches the opposite wall can be approximately calculated from the practical radius of the zirconia ball 16 and the equation (1). The zirconia ball 16 can be used for perforating another fuel injection nozzle 1 until the time. The zirconia ball 16, repeatedly used for perforating a plurality of the fuel injection nozzles 1, may be replaced at the durability limit time.

Figure 2:
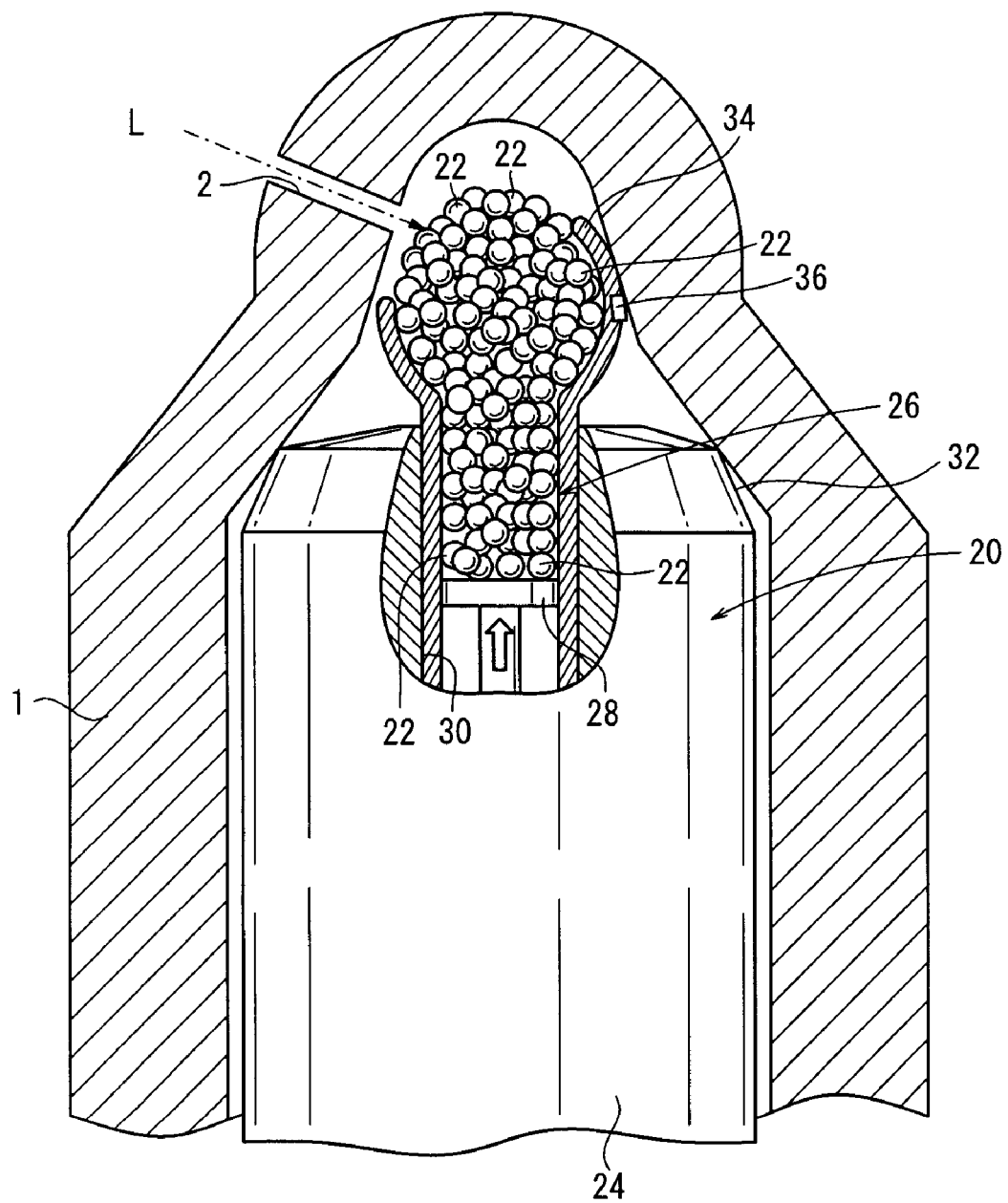
FIG. 2 is an enlarged longitudinal cross-sectional view showing a principal part of an end portion of a fuel injection nozzle, into which a perforation apparatus according to a second embodiment of the present invention is inserted.
Figure 3:
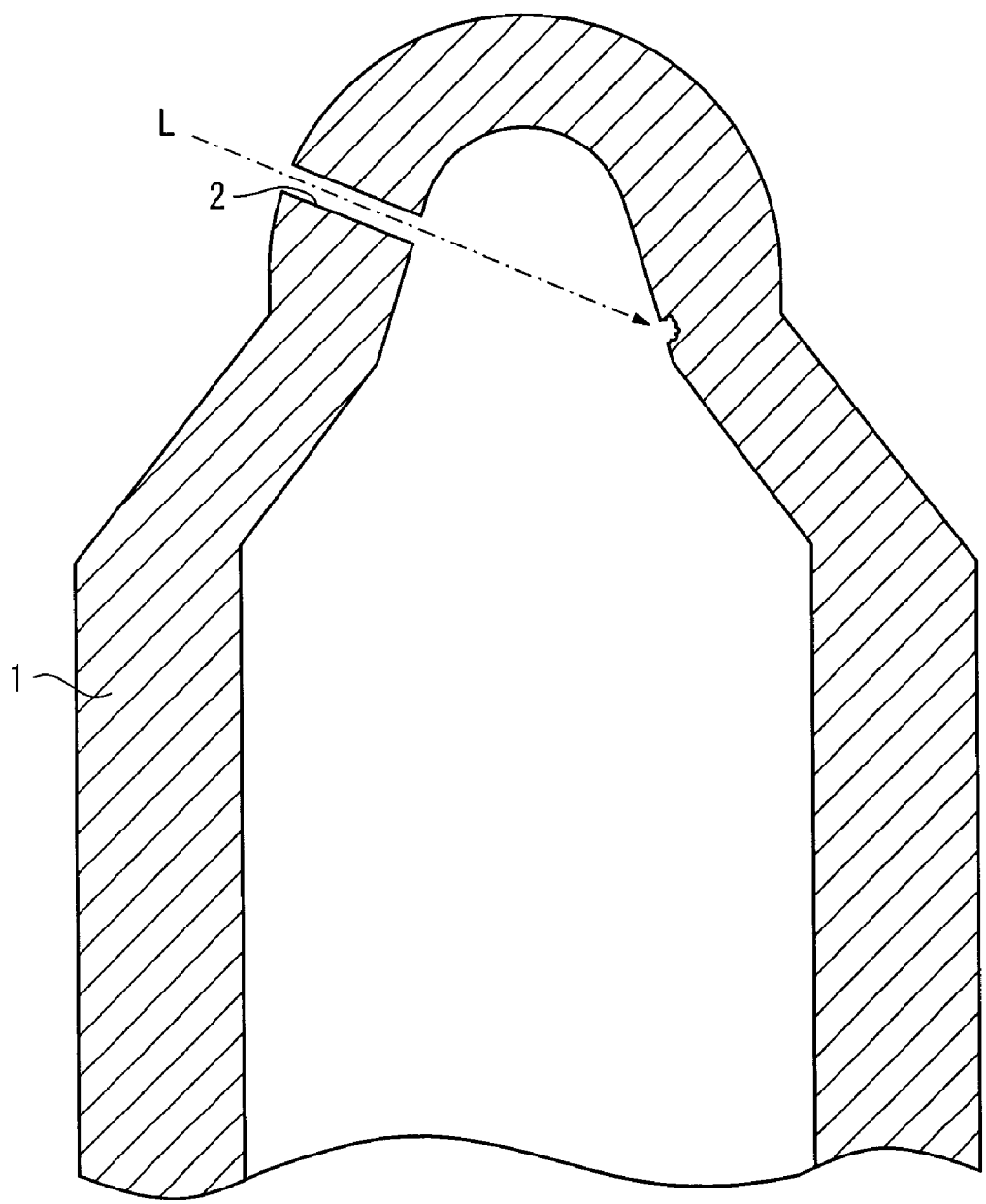
FIG. 3 is an enlarged longitudinal cross-sectional view showing a principal part of an end portion of a fuel injection nozzle, through which an injection hole is formed by irradiation with a laser light.

A perforation apparatus 20 according to a second embodiment will be described in detail below with reference to FIG. 2. As shown in FIG. 2, a powder 22 having an average diameter of about 30 to 70 μm, typically about 50 μm, is used in the perforation apparatus 20. The powder 22 comprises a zirconia.

In this embodiment, the perforation apparatus 20 contains a laser light emission mechanism (not shown), a support 24, a sleeve 26 inserted into the support 24, and a piston 28 slidably contained in the sleeve 26.

An insertion opening 30 is formed at approximately the center of the support 24 in the diameter direction. The sleeve 26 is inserted into the insertion opening 30 such that the end of the sleeve 26 is exposed from the insertion opening 30. A tapered portion 32 is formed in the end of the support 24 and is in contact with the inner surface of the fuel injection nozzle 1.

The sleeve 26 has a spherically expanded portion 34 having an opening. The height of the wall of the expanded portion 34 gradually varies around the opening such that the height of the wall is increasing from the left to the right in FIG. 2. A thermal sensor 36 is disposed in the expanded portion 34 at an area facing the opposite wall.

The piston 28 for a cylinder (not shown) is inserted into a constant diameter portion of the sleeve 26. The piston 28 is moved upward in FIG. 2 to press the powder 22.

An ultrasonic vibrator (not shown) is disposed at an upper portion of the piston 28. Thus, in the second embodiment, the powder 22 is vibrated by the ultrasonic vibrator.

A perforation method using the perforation apparatus 20 will be described below.

In the perforation method, first the piston 28 is moved backward, and the powder 22 is introduced in the sleeve 26. The powder 22 and the sleeve 26 are inserted together with the support 24 into the end portion of the fuel injection nozzle 1.

Then, as the piston 28 proceeds upward in FIG. 2, the powder 22 spills out of the opening of the expanded portion 34 of the sleeve 26, so that the fuel injection nozzle 1 is filled with the powder 22. The piston 28 is maintained to be energized under a driving force, whereby the powder 22 is constantly pressed by the piston 28.

The ultrasonic vibrator is oscillated to vibrate the powder 22. For example, the powder 22 may be vibrated under conditions of a vibration frequency of 64 kHz and an amplitude of 14 μm in the same manner as the first embodiment. The powder 22 is moved in the fuel injection nozzle 1 while changing the positions of the particles under the vibration conditions.

Then, the laser light L is emitted from the laser light emission mechanism. The conditions of the irradiation with the laser light L may be the same as those of the first embodiment.

The outer wall surface of the fuel injection nozzle 1 is irradiated with the laser light L, and the wall of the fuel injection nozzle 1 is melted by the laser light L from the outside to the inside. Finally the inner wall surface of the fuel injection nozzle 1 is melted, and the laser light L is introduced into the hollow space of the fuel injection nozzle 1. The wall of the expanded portion 34 in the sleeve 26 is positioned such that the introduction is not inhibited by the wall.

The laser light L introduced in the fuel injection nozzle 1 is applied to the moving powder 22. The powder 22 comprises zirconia, and thereby is collapsed by the laser light L while preventing the laser light L from reaching the opposite wall. A fine powder generated due to the collapse of the powder 22 penetrates between particles of the powder 22.

When the powder 22 is collapsed, a cavity (a pore) is generated. However, since the powder 22 is constantly moving, the pore is rapidly filled. Thus, the laser light L does not pass the powder 22 through the pores.

When the fine powder is generated and penetrates between the particles of the powder 22, the apparent volume of the powder 22 is reduced. In the second embodiment, a pressure is applied to the powder 22 by the piston 28. Therefore, when the apparent volume of the powder 22 is reduced and the pores are increased, the piston 28 is moved upward to compress the powder 22. As a result, the pore is filled, and the path of the laser light L is closed. It should be noted that the powder 22 comprising the zirconia generates only a smaller amount of the fine powder in the same manner as the zirconia ball 16 of the first embodiment.

In the second embodiment, the laser light L can be prevented from reaching the opposite wall in the above manner, so that the opposite wall is not damaged.

In a case where the powder 22 is deteriorated and the laser light L can pass through the powder 22, the laser light L reaches the area in the expanded portion 34, corresponding to the opposite wall. The temperature of the area is increased by the laser light L, and the temperature increase is detected by the thermal sensor 36 disposed in this area. Thus, it can be judged by the thermal sensor 36 whether the laser light L reaches the wall of the expanded portion 34 or not. The opposite wall can be reliably prevented from being damaged such that when the laser light L is judged to reach the area, the irradiation of the laser light L is stopped.

Though the ball and powder fillers used in the first and second embodiments are composed of the zirconia, the material of the filler is not limited thereto. Examples of the materials include ceramics such as aluminas, silicon nitrides, and silicon carbides, and high-melting metals.

The above described laser light irradiation conditions and vibration conditions are considered in all respects to be illustrative and not restrictive, and various changes may be made therein depending on the thickness of a workpiece to be perforated.

Further, the workpiece to be perforated is not limited to the fuel injection nozzle 1, and may be any member having a hollow structure.

Although certain preferred embodiments of the present invention have been shown and described in detail, it should be understood that various changes and modifications may be made therein without departing from the scope of the appended claims.

What is claimed is:
1. A perforation method for forming a through-hole in a wall of a hollow member by irradiating said wall with a laser light from the outside, comprising the steps of:
   inserting a filler that is not melted by said laser light into said hollow member,
   inserting a vibration mechanism into the hollow member that is to have the through-hole formed by the laser light; and
   irradiating said wall with said laser light while vibrating said filler with the vibration mechanism,
   wherein when said through-hole is formed, said laser light is applied through said through-hole to said filler and the vibration mechanism ensures that different points on the filler are exposed to the laser light that passes through the through-hole.

2. The perforation method according to claim 1, wherein said filler is ultrasonically vibrated.

3. The perforation method according to claim 1, wherein the vibration mechanism is inserted into the hollow member so that the filler is between the vibration mechanism and the wall.

4. The perforation method according to claim 1, wherein the laser light irradiates the wall at a frequency which is less than a frequency that the vibration mechanism vibrates the filler.

5. The perforation method according to claim 1, wherein the filler is vibrated by the vibration mechanism so as to cause the filler to rotate and also to move toward and away from the vibration mechanism.

6. The perforation method according to claim 1, further comprising the steps of:
sensing a temperature within the hollow member; and
stopping irradiation of the wall with the laser light when the sensed temperature exceeds a predetermined value.

7. A perforation apparatus for forming a through-hole in a wall of a hollow member by irradiating said wall with a laser light from the outside, comprising:
a filler that is inserted into said hollow member and is not melted by said laser light, and
a vibration mechanism that vibrates said filler, the vibration mechanism being adapted to be selectively inserted into the hollow member that is to have the through-hole formed by the laser light, wherein the vibration mechanism ensures that different points on the filler are exposed to the laser light that passes through the through-hole.

8. The perforation apparatus according to claim 7, wherein said vibration mechanism includes an ultrasonic vibrator.

9. The perforation apparatus according to claim 7, wherein said filler comprises a spherical body.

10. The perforation apparatus according to claim 9, wherein a minimum radius R for said spherical body is obtained using the following equation:

$$R=\{(3V_0-tfZ)/4\pi\}^{1/3},$$

wherein $V_0$ is a volume of said spherical body before the irradiation with said laser light, Z is a volume of a collapsed portion in said spherical body per one pulse, t is a time of the irradiation with said laser light, and f is an oscillation frequency of said laser light.

11. The perforation apparatus according to claim 9, wherein said spherical body is a zirconia ball.

12. The perforation apparatus according to claim 9, further comprising a fine powder suction/discharge means.

13. The perforation apparatus according to claim 7, wherein said filler comprises a powder.

14. The perforation apparatus according to claim 13, wherein said powder is a zirconia powder.

15. The perforation apparatus according to claim 7, wherein the vibration mechanism is disposed within the hollow member so that the filler is between the vibration mechanism and the wall.

16. The perforation apparatus according to claim 7, wherein the vibration mechanism is adapted to vibrate the filler at a frequency that is greater than a frequency at which the laser light irradiates the wall.

17. The perforation apparatus according to claim 7, wherein the vibration mechanism is adapted to vibrate the filler so as to cause the filler to rotate and also to move toward and away from the vibration mechanism.

18. The perforation apparatus according to claim 7, further comprising:
a support defining an insertion opening, the support including a tapered portion adapted for contact with an inner surface of the hollow member;
a sleeve coaxially received within the support and extending through the insertion opening; and
a piston slidably received within the sleeve.

19. The perforation apparatus according to claim 18, the sleeve including a spherically expanded portion that defines an opening that is collinear with the through-hole of the hollow member.

20. The perforation apparatus according to claim 19, further comprising:
a thermal sensor disposed on the expanded portion at an area facing the through-hole of the hollow member, wherein the filler is disposed between the thermal sensor and the opening.

* * * * *